United States Patent
Bouthillier

(12) 
(10) Patent No.: US 6,715,980 B2
(45) Date of Patent: Apr. 6, 2004

(54) TILTABLE CONTAINER

(76) Inventor: Mario Bouthillier, 918 Ch. Du Sault-St-Louis, La Prairie (CA), J5R 1E1

( * ) Notice: Subject to any disclaimer, the term of this patent is extended or adjusted under 35 U.S.C. 154(b) by 53 days.

(21) Appl. No.: 10/209,888

(22) Filed: Aug. 2, 2002

(65) Prior Publication Data

US 2004/0022616 A1 Feb. 5, 2004

(51) Int. Cl.[7] .............................................. B65B 21/02
(52) U.S. Cl. ........................ 414/642; 414/420; 414/422; 298/17 R
(58) Field of Search ................................. 414/642, 420, 414/422, 424, 607, 608, 697, 703, 421; 298/17 R

(56) References Cited

U.S. PATENT DOCUMENTS

| | | | |
|---|---|---|---|
| 994,909 A | * 6/1911 | Grody | ........................ 220/479 |
| 2,689,054 A | 9/1954 | Martin | |
| 2,713,431 A | 7/1955 | Koehler | |
| 2,738,222 A | 3/1956 | Needham | |
| 2,860,797 A | 11/1958 | Wilcox | |
| 2,921,703 A | 1/1960 | Dempster et al. | |
| 2,978,126 A | 4/1961 | Chambers | |
| 3,013,684 A | 12/1961 | King et al. | |
| 3,360,143 A | 12/1967 | Allen | |
| 3,486,648 A | * 12/1969 | Wald | ........................... 414/420 |
| 3,613,924 A | 10/1971 | Monson | |
| 3,656,643 A | 4/1972 | Keneson et al. | |
| 3,856,164 A | * 12/1974 | Torvund | ..................... 414/422 |
| 3,877,593 A | 4/1975 | Sleziak | |
| 3,881,617 A | 5/1975 | Miller et al. | |
| 3,984,017 A | 10/1976 | Giles | |
| 4,005,791 A | * 2/1977 | Stragier et al. | ............. 414/408 |
| 4,566,840 A | * 1/1986 | Smith | ......................... 414/408 |
| 5,897,283 A | * 4/1999 | Lenguyen | ................... 414/490 |

* cited by examiner

Primary Examiner—Richard Ridley

(57) ABSTRACT

A container for storing bulk material including a base wall, first and second end walls and a pair of sidewalls for forming an opened top enclosure. The container is transportable and tiltable between a generally upright storage position and a tilted dumping position either manually or through the use of a conventional forklift truck. The base and sidewalls define respectively first and second abutment walls both recessing inwardly and being formed integrally with the remainder of the container. The lifting tines of the forklift truck are adapted to contact the first abutment walls for supporting the container in its generally upright position. The sidewalls also define a recessed section allowing the container to pivot about a pivot location located generally about the center of mass of the container between the upright position and the tilted position wherein the lifting tines abuttingly contact the second abutment walls.

20 Claims, 5 Drawing Sheets

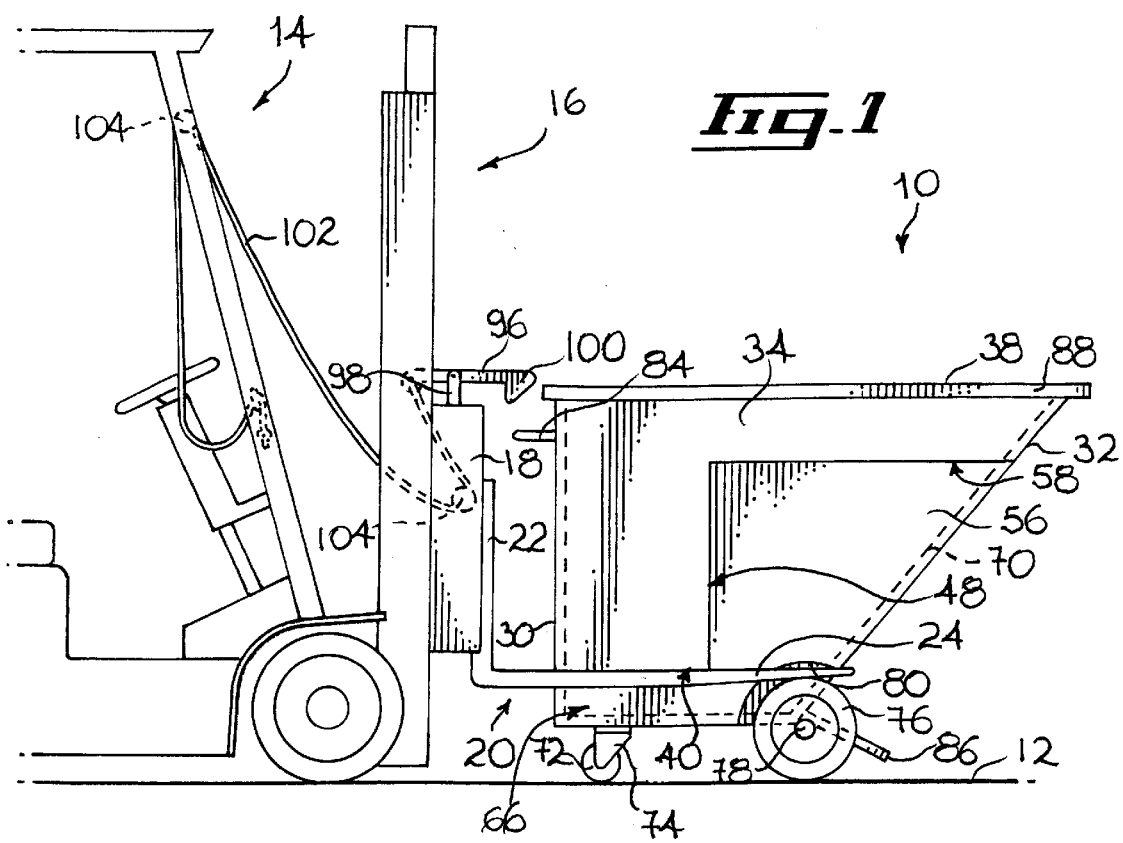
Fig_1
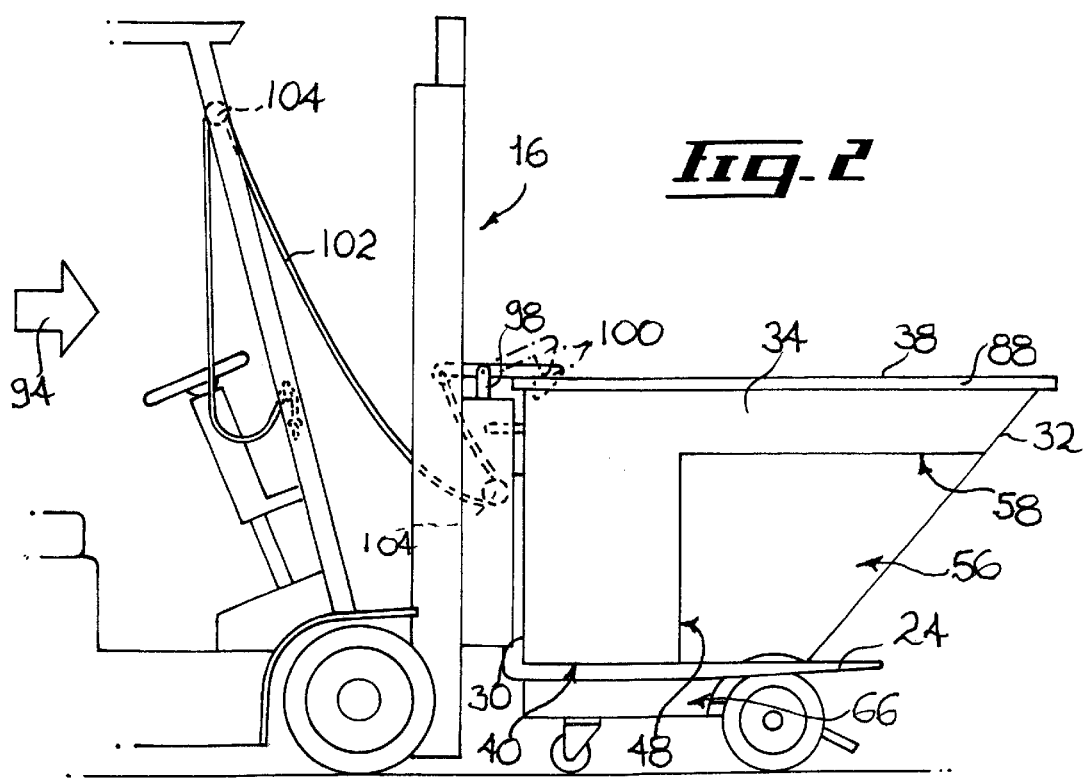
Fig_2

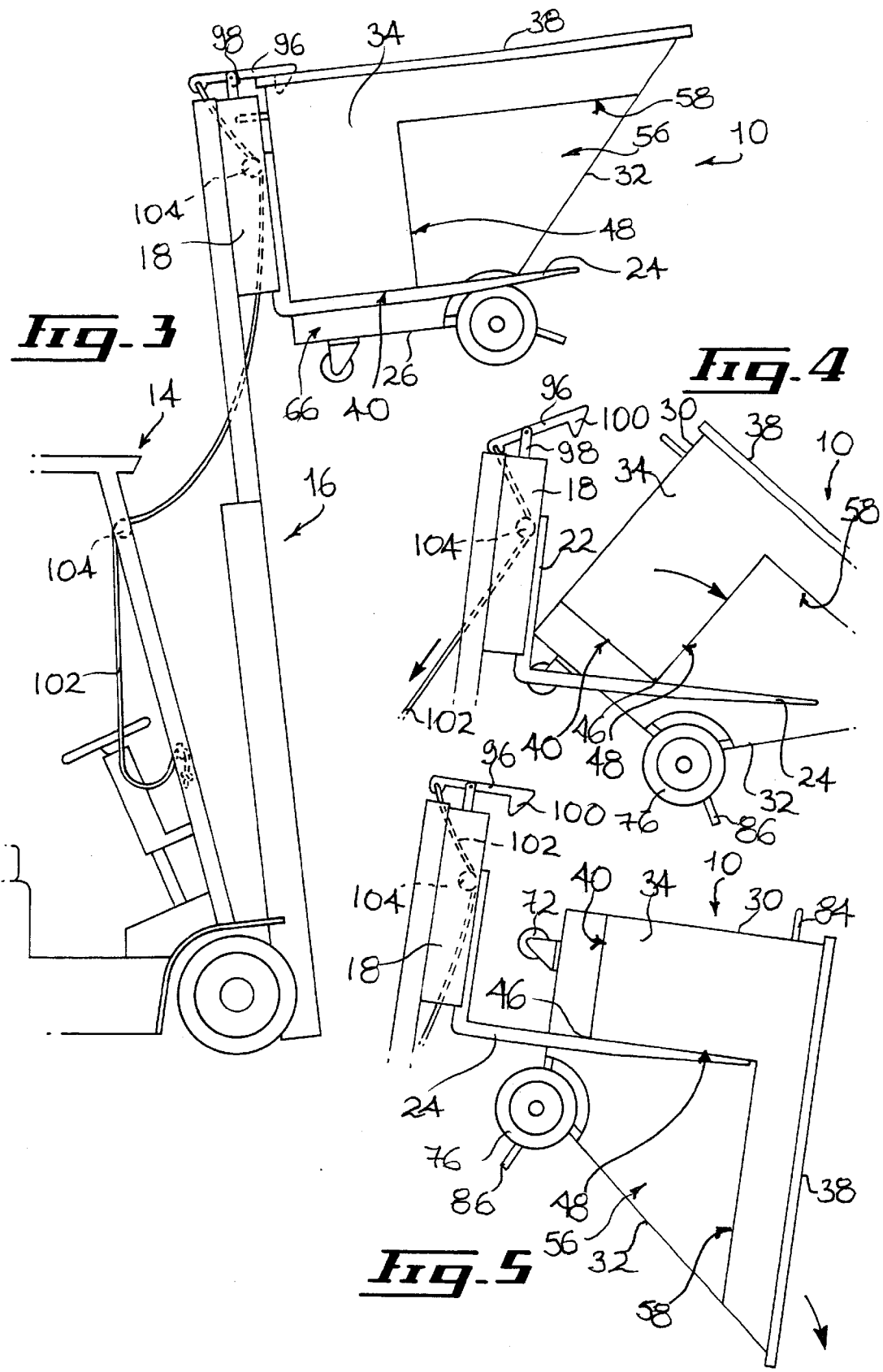

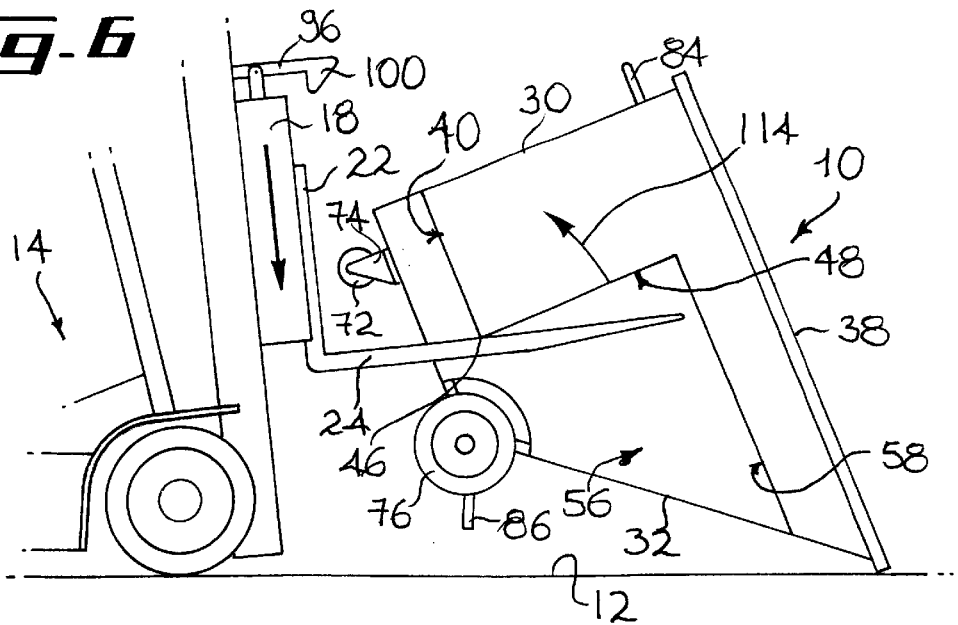
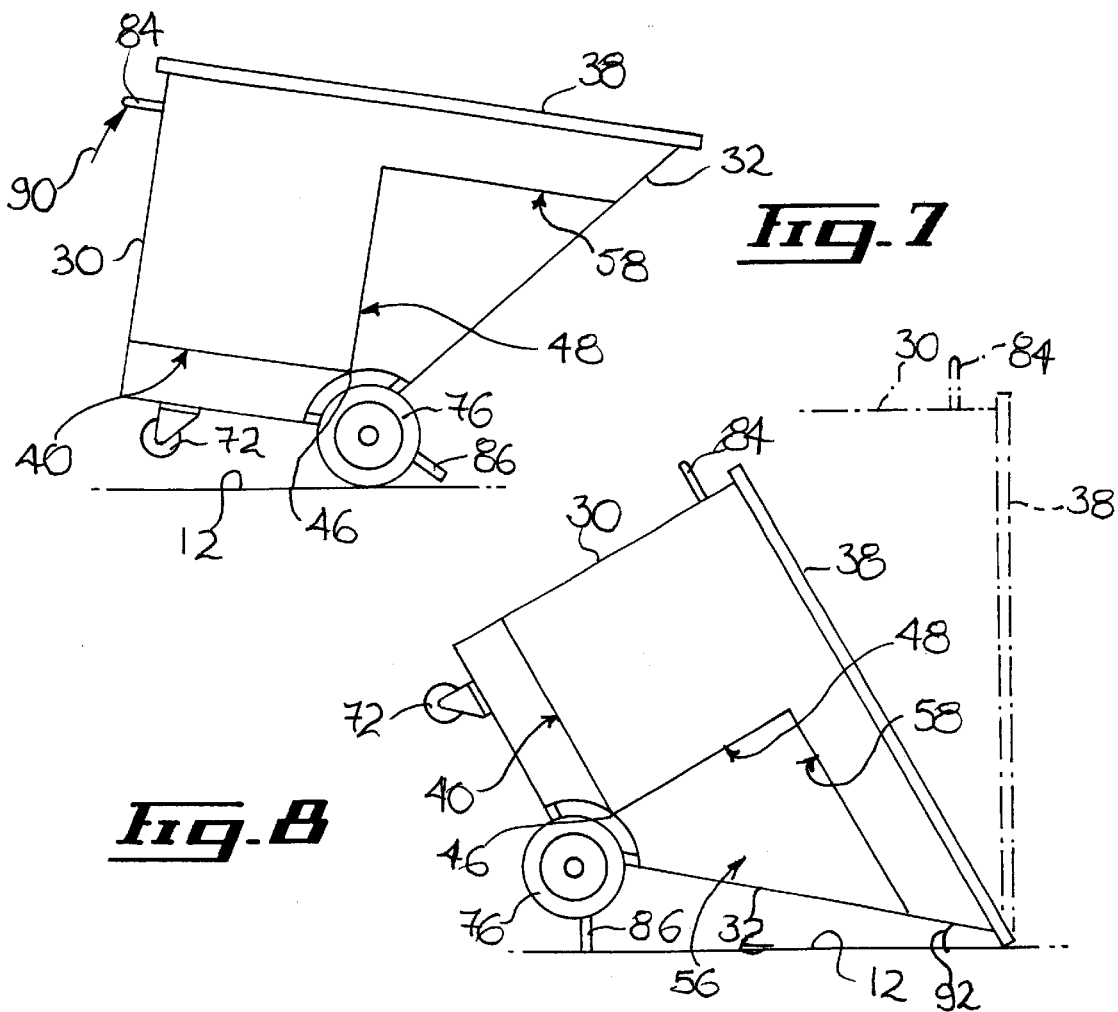

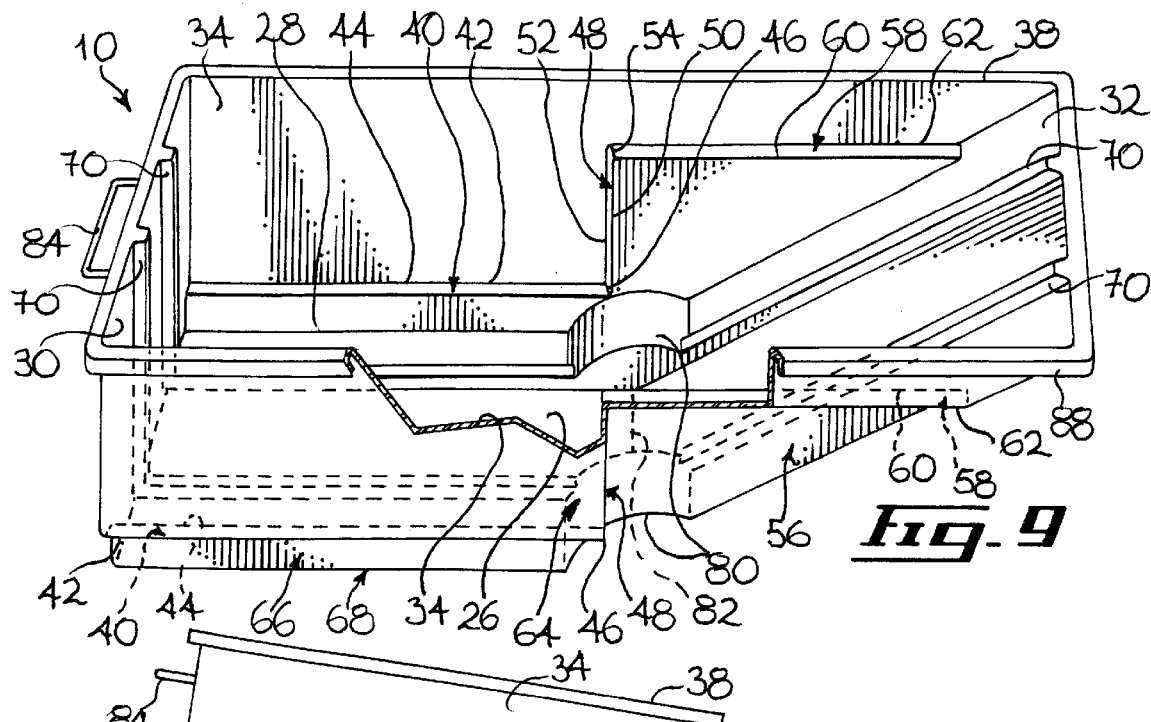
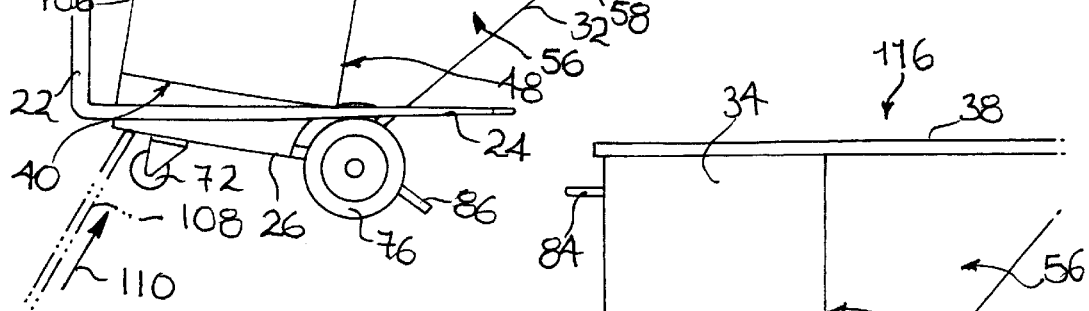
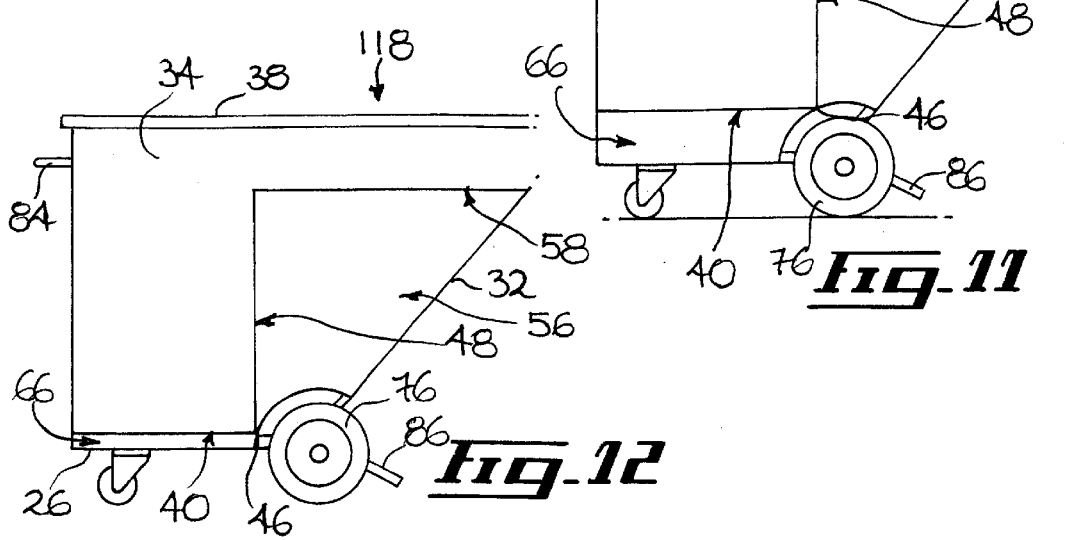

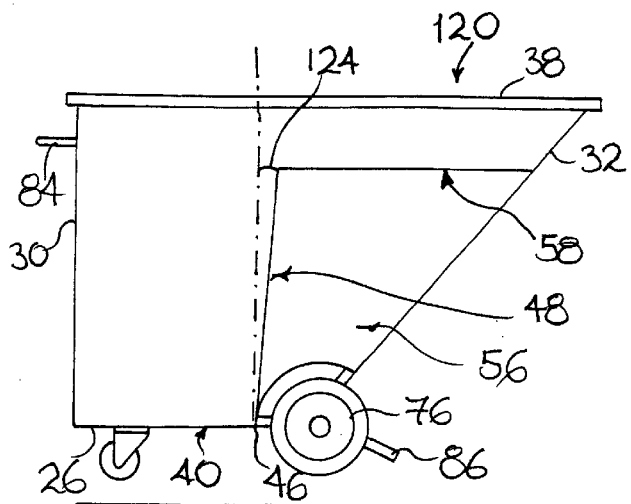
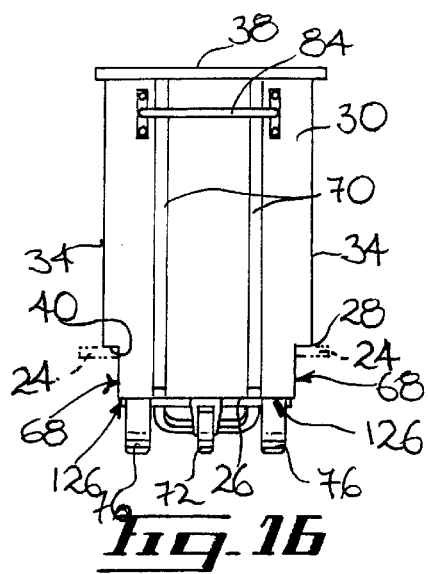
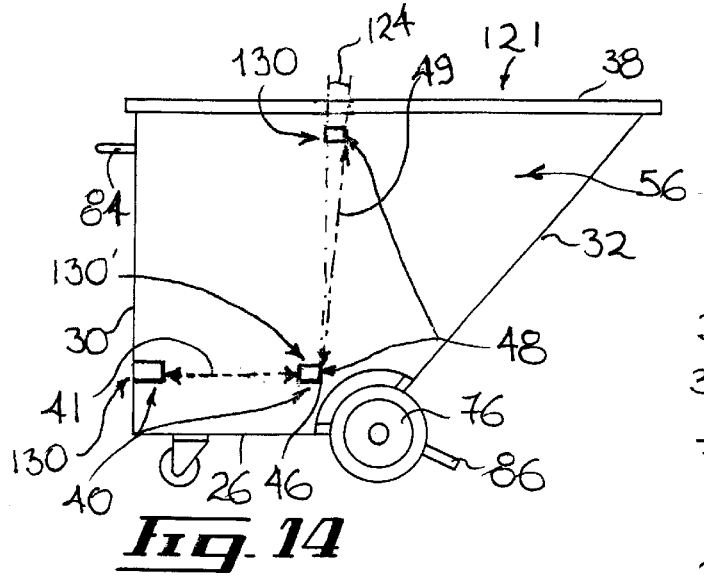
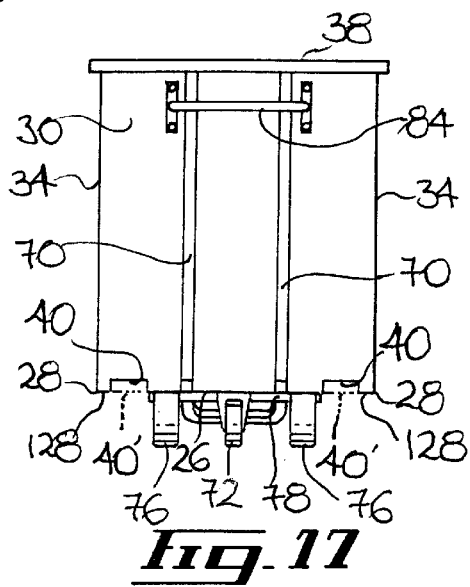
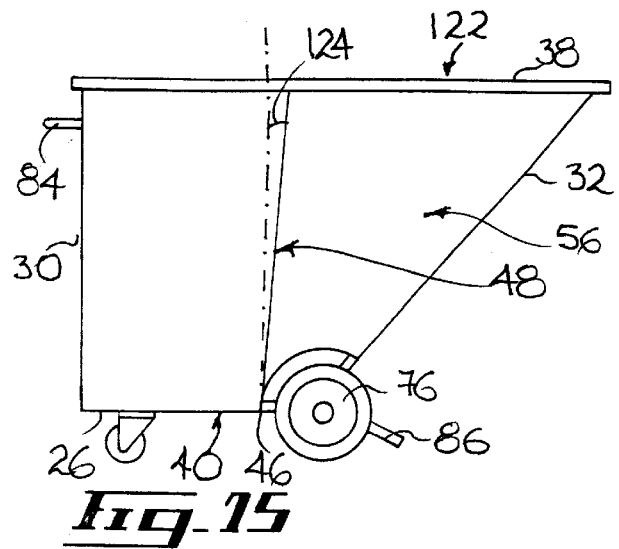

TILTABLE CONTAINER

FIELD OF THE INVENTION

The present invention relates to the general field of containers and is particularly concerned with an industrial-type container adapted to be transported and tilted either manually or with the help of a forklift truck.

BACKGROUND OF THE INVENTION

There exist a variety of situations wherein it is desirable to collect bulk material including rubbish or waste in a container adapted to be transported to a remote location for further processing. Common industrial waste typically collected in containers include bulk waste paper, scrap metal, broken glass, sand, castings, forging, stamped parts, scraps, dust and the like. The prevailing trend in industrial settings is to transport the containers either by manually rolling the latter on the ground surface or by lifting and carrying the containers using conventional forklift trucks.

As is well known in the art, there exist various constructions of lift trucks, among the best known of which are the so-called forklift trucks. Such forklift trucks are typically self-propelled vehicle having, usually at their front end, a support frame or similar structure. A mounting element, such as a mounting frame is mounted on the support frame at least for up and down movements relative to the latter.

A carrying component operable for engaging an object to be lifted is mounted on the mounting element for displacement therewith. The carrying component typically includes pair of fork prongs. Each of such fork prongs typically defines a load-engaging portion and a mounting portion, which extends at substantially right angle to the load-engaging portion.

Conventional containers used with forklift trucks include open topped containers in which the base is pivotal but retained close by a latch. Unlatching frees the base to pivot open when the container is lifted or tilted. Another conventional container is the so-called self-tipping skip/self-dumping hopper. This type of container typically has an open topped body mounted on a vase and pivotable in a constant plane between a normal "loading position" in which the body is substantially upright and a tipped-forward "emptying or dumping position".

Such self-dumping bins are typically shaped with at least one of their walls angled upwardly and forwardly so that the area adjacent the bottom of the container is smaller than the area of the open top. When such a bin is filled with a generally homogeneous material it becomes relatively unstable. The resulting center of gravity is typically positioned just within the forward edge of the bottom so that the bin will normally remain upright. However, a slight tilt forward causes the center of gravity to shift beyond the forward edge of the bottom so that the bin tips forward to a dumping position.

The prior art is replete with various structures offering variations on the general concept of self-dumping bins adapted for use with conventional forklift trucks. Examples of patents disclosing such variations include U.S. Pat. No. 2,689,054 issued Sep. 14th, 1954 naming Thomas J. Martin as inventor, U.S. Pat. No. 2,738,222 issued Mar. 13th, 1956 naming V. H. Needham as inventor, U.S. Pat. No. 2,860,797 issued Nov. 18th, 1958 naming J. F. Wilcox as inventor, U.S. Pat. No. 2,921,703 issued Jan. 19th, 1960 naming G. R. Dampster et al as inventors, U.S. Pat. No. 2,978,126 issued Apr. 4th, 1961 and naming B. D. Chambers as inventor, U.S. Pat. No. 3,013,684 issued Dec. 19th, 1961 naming J. A. King et al as inventors, U.S. Pat. No. 3,486,678 issued Dec. 30th, 1969 naming C. O. De Wald as inventor, U.S. Pat. No. 3,656,643 issued Apr. 18th, 1972 naming Keneson et al as inventor, U.S. Pat. No. 2,860,797, U.S. Pat. No. 3,877,593 issued Apr. 15th, 1975 naming Ladislas Sleziak as inventor, an U.S. Pat. No. 3,881,617 issued May 6th, 1975 naming William T. Miller and William G. Morgan as inventors.

Although somewhat useful, the prior art structures suffer from numerous drawbacks. A common major drawback associated with most prior art structures is that they are typically overly complex often requiring assembly of various components. The undue complexity of the prior art structures not only unduly increases manufacturing costs but also renders these structures more or less reliable and more susceptible to failure or breakdown.

Also, some of the prior art structures require modifications to the conventional forklift truck in order to be used efficiently. This increases the overall operational costs for using the container. It also limits the use of the forklift truck to a single type of usage. Other structures require only temporary modifications to conventional forklift trucks using removable adaptors. However, installation and removal of these removable adaptors on the conventional forklift trucks is both tedious and time consuming.

Furthermore, some prior art structures only provide limited pivotal movement and, hence, sometimes lead to incomplete dumping of the material contained therein. Some structures also require complex operations for effecting their pivotal movement between the upright "containing" and tilted "dumping" positions. Other structures require tedious and time-consuming operations for both installation of the container on the tines of the forklift and removal of the container therefrom. Yet other structures provide containers that are not adapted to the safely mounted on the tines of conventional forklift trucks potentially leading to both injury and the destruction of material. Accordingly, there exist a need for an improved tiltable container.

SUMMARY OF THE INVENTION

It is a general object of the present invention to provide an improved tiltable container.

In accordance with the present invention, there is provided A container for use with a forklift, the forklift having a pair of generally elongated and spaced apart lifting tines, the container defining a container centre of mass, the container comprising a base wall, the base wall defining a base wall peripheral edge; a first end wall and a second end wall, the first and second end walls both extending from the base wall in a generally opposed relationship relative to each other; a pair of side walls, each of the side walls extending from the base wall between the first and second end walls and in a generally opposed relationship relative to each other so that the side walls, the first end wall and the second end wall together define an open-topped enclosure having an opening defining an opening peripheral edge; the base wall defining a pair of first abutment walls, each of the first abutment walls extending inwardly in a generally perpendicular relationship relative to an adjacent side wall, from a first surface inner edge to a first surface outer edge, and, in a direction leading generally towards the second end wall, from the first end wall to a pivot location located generally adjacent the projection of the container centre of mass; each of the side walls defining a corresponding second abutment wall extending in a generally perpendicular relationship relative to the corresponding side wall, from a second surface inner edge to a second surface outer edge, and, in a direction leading generally towards the opening peripheral edge, from the pivot location to a second surface end location; each of the side walls also defining a corresponding recessed section extending in a generally perpendicular relationship relative to the first and second abutment walls from the pivot location to the second surface end location, the recessed section being recessed inwardly relative to the second abutment wall from the second surface inner edge to the second end wall; whereby each of the lifting tines is adapted to contact a corresponding one of the first abutment walls for supporting the container in a generally upright position, the recessed section allowing the container to pivot relative to the lifting tines about the pivot location between the upright position and a tilted position wherein each of the lifting tines abuttingly contacts a corresponding one of the second abutment walls.

Preferably, the container is made out of an integral piece of material. In at least one embodiment of the invention, at least one of the first or second abutment walls forms a generally continuous abutment surface from one longitudinal end thereof to the other. In at least one alternative embodiment of the invention, either one of the pairs of first or second abutment walls includes a discontinuous abutment wall made of spaced apart abutment wall segments.

In accordance with at least one embodiment of the invention, the container further includes a pair of clearance surfaces, each of the clearance surfaces extending in a generally perpendicular relationship relative to an adjacent side wall, from a clearance surface inner edge to a clearance surface outer edge; and, in a direction leading towards the second end wall, from a corresponding second surface end location to the second end wall.

In accordance with the present invention, there is also provided container for use with a forklift, the forklift having a pair of generally elongated and spaced apart lifting tines, the container defining a container centre of mass, the container comprising: a base wall, the base wall defining a base wall peripheral edge; a first end wall and a second end wall, the first and second end walls both extending from the base wall in a generally opposed relationship relative to each other; a pair of side walls, each of the side walls extending from the base wall between the first and second end walls and in a generally opposed relationship relative to each other so that the side walls, the first end wall and the second end wall together define an open-top enclosure having an opening defining an opening peripheral edge; each of the side walls defining a corresponding side wall recessed section extending from the second end wall to a corresponding second abutment wall, each of the side wall recessed sections being recessed inwardly relative to a corresponding side wall adjacent section of the side wall located towards the first end wall, the second abutment wall extending integrally between the side wall recessed section and the side wall adjacent section in a generally perpendicular relationship relative to the latter; the base wall defining a base wall recessed section extending from the first end wall to the side wall recessed section, the base wall recessed section being recessed towards the opening relative to a base wall adjacent section located inwardly relative to the base wall recessed section, the base wall recessed section being also recessed inwardly relative to the side wall adjacent section, a first abutment wall extending integrally between the base wall recessed section and the side wall adjacent section in a generally perpendicular relationship relative to the latter; the first abutment wall extending in a generally perpendicular relationship relative to the second abutment wall and merging integrally with the latter at a pivot location located generally adjacent the container centre of gravity.

In accordance with the present invention, there is further provided, in combination, a container and a pair of lifting tines part of a fork-lift, the lifting tines being generally elongated and spaced apart from each other, the container defining a container centre of mass, the container comprising: a base wall, the base wall defining a base wall peripheral edge; a first end wall and a second end wall, the first and second end walls both extending from the base wall in a generally opposed relationship relative to each other; a pair of side walls, each of the side walls extending from the base wall between the first and second end walls and in a generally opposed relationship relative to each other so that the side walls, the first end wall and the second end wall together define an open-top enclosure having an opening defining an opening peripheral edge; the base wall together defining with each of the side walls a corresponding recessed section recessed inwardly relative to a corresponding adjacent section of each of the side walls; a first abutment wall and a second abutment wall both extending integrally between each of the recessed sections and corresponding adjacent section, each of the first and second abutment walls intersecting each other about a corresponding pivot location; the first abutment walls being configured and sized for abuttingly supporting the container on the tines in a generally upright configuration, the second abutment walls being configured and sized for supporting the container on the tines in a generally tilted configuration and the recessed section being configured and sized so as to allow the container to be pivoted between the generally upright and generally tilted positions about the intersections between the first and second abutment walls.

Conveniently, the first abutment walls extend from the first end surface so as to allow the tines to be slidably inserted underneath the first abutment walls from the first end surface. Preferably, the intersections between the first and second abutment walls is located generally adjacent the container centre of mass.

Advantages of the present invention include that the proposed container can be used for receiving, handling and transporting various types of material including bulk material such as waste material or any other suitable material. The container can be transported between various locations and pivoted between a generally upright storage configuration and a generally tilted dumping configuration either through a manual operation or through the use of a conventional lifting truck or trolley such as conventional forklift truck.

The proposed container is designed to be mountable onto and removable from the tines of a conventional forklift truck through a set of quick, easy and ergonomic steps without requiring undue dexterity. Once mounted on the tines of a forklift truck, the container is stable enough so as to reduce the risks of accidents.

Furthermore, once lifted by the forklift truck, the container is easily pivotable between its upright storage configuration and its tilted dumping configuration through a set of quick and ergonomic steps without requiring complex procedural steps. When mounted on the tines of a forklift truck, the container may be pivoted either manually or through the use of an automatic mechanism including a latch.

Still furthermore, the proposed container is designed so as to be usable with conventional forklift trucks without requiring modifications to the latter. Also, the proposed container is designed so as to be manufacturable as an integral unit without the need for assembly of various components. The container is specifically designed so as to be manufacturable using a conventional form of manufacturing such as an injection molding process with a conventional material such as a conventional polymeric resin hence providing a container that will be economically feasible, long lasting and relatively trouble free in operation.

Other objects and advantages of the present invention will become apparent from a careful reading of the detailed description provided herein, with appropriate reference to the accompanying drawings.

BRIEF DESCRIPTION OF THE DRAWINGS

Embodiments of the present invention will now be disclosed, by way of example, in reference to the following drawings in which:

FIG. 1 in a partial side elevational view with sections taken out illustrates a container in accordance with an embodiment of the present invention being mounted on the tines of a conventional forklift truck, only a section of the forklift truck being shown and only one of the tines being shown;

FIG. 2 in a partial side elevational view with sections taken out illustrates the container shown in FIG. 1 about to be locked to the lifting assembly of the forklift truck;

FIG. 3 in a partial side elevational view with sections taken out illustrates the container shown in FIGS. 1 and 2 being lifted by the forklift truck;

FIG. 4 in a partial side elevational view with sections taken out illustrates the container shown in FIGS. 1 through 3 tilting in a generally upright position to a generally inclined dumping position;

FIG. 5 in a partial side elevational view with sections taken out illustrates the container shown in FIGS. 1 through 4 in a tilted dumping configuration;

FIG. 6 in a partial side elevational view with sections taken out illustrates the container shown in FIGS. 1 through 5 being tilted back from its dumping configuration towards its generally upright storage configuration;

FIG. 7 in a side elevational view illustrates the container shown in FIGS. 1 through 6 resting on a ground surface and being tilted towards a dumping configuration;

FIG. 8 in a side elevational view illustrates the container shown in FIGS. 1 through 7 in its dumping configuration;

FIG. 9 in a partial perspective view with sections taken out illustrates the configuration of part of the container shown in FIGS. 1 through 8;

FIG. 10 in a partial side elevational view with sections taken out illustrates a container such as shown in FIGS. 1 through 9 mounted on the tines of a conventional forklift truck (only one of which being partially shown) being tilted using a tilting handle, the tilting handle being shown in phantom lines;

FIG. 11 in a partial side elevational view illustrates a container in accordance with an alternative embodiment of the present invention;

FIG. 12 in a partial side elevational view illustrates a container in accordance with another alternative embodiment of the invention;

FIG. 13 in a side elevational view illustrates a container in accordance with yet another alternative embodiment of the present invention;

FIG. 14 in a side elevational view illustrates a container in accordance with still another embodiment of the present invention;

FIG. 15 in a side elevational view illustrates a container in accordance with yet still another embodiment of the present invention;

FIG. 16 in a rear view illustrates a container such as shown in FIG. 14; and

FIG. 17 in a rear view illustrates a container such as shown in FIG. 15.

DETAILED DESCRIPTION OF THE PREFERRED EMBODIMENTS

With reference to the annexed drawings the preferred embodiments of the present invention will be herein described for indicative purpose and by no means as of limitation. Referring to FIG. 1, there is shown a container 10 in accordance with an embodiment of the present invention. The container 10 is shown resting on a ground surface 12 and about to be lifted by a conventional forklift truck 14.

As is well known in the art, conventional forklift trucks 14 typically include a support frame 16 extending frontwardly therefrom. A mounting frame 18 is slidably mounted on the support frame 16 for at least up and down movement relative thereto. A pair of lifting forks 20 (only one of which is shown in FIG. 1) is attached to the mounting frame 18.

Each lifting fork 20 typically includes an attachment section 22 for attachment to the mounting frame 18 and a generally elongated load-engaging lifting tine 24 extending generally perpendicularly from the attachment section 22. Typically, the forklift truck 14 is hence provided with a pair of generally elongated lifting tines 24 extending generally frontwardly from the forklift truck 14 and in a generally spaced-apart relationship relative to each other.

It should be understood that although the container 10 is shown throughout the figures as being used with a specific type of lifting truck, the container 10 could be used with any suitable type of lifting trucks including other configurations of forklift trucks having other types of fork arrangements without departing from the scope of the present invention.

Referring now more specifically, to FIG. 9, there is shown in a partial perspective view the configuration of the body of a container 10 in accordance with an embodiment of the present invention. The container 10 includes a base wall 26 defining a base wall peripheral edge 28. The container 10 also includes a peripheral wall extending from the base wall 26 generally adjacent the base wall peripheral edge 28. In the embodiments shown throughout the figures, the peripheral wall is divided into various segments. It should be understood that the peripheral wall could include any suitable number of segments having any suitable shape without departing from the scope of the present invention.

Typically, the container 10 includes a first end wall 30 and a second end wall 32. The first and second end walls 30, 32 both extend from the base wall 26 in a generally opposed relationship relative to each other. The container 10 also typically includes a pair of sidewalls 34. Each of the sidewalls 34 extends from the base wall 36 between the first and second end walls 30, 32. The first end wall 30, the second end wall 32 and the sidewalls 34 hence together define an open topped enclosure 36 defining an opening peripheral edge 38.

Typically, the second end wall 32 tapers inwardly towards the first end wall 30 in a direction leading from the opening peripheral edge 38 to the base wall 26. Hence, typically, the opening defined by the opening peripheral edge 38 is somewhat larger than the base wall 26.

The angled configuration of the second end wall 32 is intended to facilitate both tilting of the container 10 towards its tilted dumping configuration and dumping of the material contained within the enclosure 26 once the container 10 has been tilted to its dumping configuration shown in FIGS. 5 and 8. It should however be understood that the second end wall 32 may assume other configurations and orientations without departing from the scope of the present invention.

Also, throughout the figures, the base wall 26 and the opening peripheral edge 38 are shown as extending substantially in generally parallel and spaced-apart first and second referential planes. The first end wall 30 is shown as extending substantially in a third referential plane generally perpendicular to the first and second referential planes. The sidewalls 34 are shown as extending substantially respectively in fourth and fifth spaced-apart referential planes both generally perpendicular to the first, second and third referential planes.

Furthermore, the base wall 26 is shown as having a generally rectangular configuration while the base wall 26, the first and second end walls 30, 32, and the sidewalls 34 are all shown as having a generally flat configuration. It should however be understood that the container could have any suitable configuration without departing from the scope of the present invention.

For example, the base wall 26 could have a generally concave configuration, the first end wall 30 could be angled relative to the base wall 26, the sidewalls 34 could be beveled outwardly relative to the base wall 26. In fact, any suitable modification could be made to the general configuration of the body of the embodiments shown throughout the figures without departing from the scope of the present invention.

The base wall 26 defines a pair of first abutment walls 40. Each first abutment wall 40 extends inwardly in a generally perpendicular relationship relative to an adjacent section of a corresponding side wall 34, from a first wall inner edge 42 to a first wall outer edge 44. Each first abutment wall 40 also extends in a direction leading generally towards the second end wall 32, from the first end wall 30 to a pivot location 46 located generally adjacent the lateral projection of the center of mass of the container 10 on the corresponding sidewall 34.

Each sidewall 34 defines a corresponding second abutment wall 48. Each second abutment wall 48 extends in a generally perpendicular relationship relative to an adjacent section of a corresponding sidewall 34, from a second wall inner edge 50 to a second wall outer edge 52. Each second abutment wall 48 also extends in a direction leading generally towards the opening peripheral edge 38, from the pivot location 46 to a second abutment wall end location 54.

Each of the sidewalls 34 also defines a corresponding recessed section 56 extending in a generally perpendicular relationship relative to the adjacent first and second abutment walls 40, 48. Each recessed section 56 extends from the pivot location 46 to the second surface end location 54. Each recessed section 56 is recessed inwardly relative to a corresponding second abutment wall 48, from the second surface inner edge 50 to the second end wall 32.

In the embodiment of the invention shown in FIGS. 1 through 9, the container 10 further includes a pair of clearance walls 58. Each clearance wall 58 extends inwardly and generally perpendicularly relative to an adjacent section of a corresponding sidewall 34, from a clearance wall inner edge 60 to a clearance wall outer edge 62. Each clearance wall 58 also extends in a direction leading towards the second end wall 32, from a corresponding second surface end location 54 to the second end wall 32.

Each sidewall 34 hence defines a corresponding sidewall recessed section 56 extending from the second end wall 32 to a corresponding second abutment wall 48. Each sidewall recessed section 56 is recessed inwardly relative to a corresponding sidewall adjacent section 64 of the corresponding sidewall 34 located towards the first end wall 30. The second abutment wall 48 extends preferably integrally between the sidewall recessed section 56 and the sidewall adjacent section 64 in a generally perpendicular relationship relative to the latter.

Similarly, in the embodiment shown in FIGS. 1 through 10, the base wall 26 defines a base wall recessed section 66 extending from the first end wall 30 to the corresponding sidewall recessed section 56. The base wall recessed section 66 is recessed towards the opening of the enclosure 46 relative to a base wall adjacent section 68 located inwardly relative to the sidewall adjacent section 64.

The first abutment wall 40 extends preferably integrally between the base wall recessed section 66 and the sidewall adjacent section 64 in a generally perpendicular relationship relative to the latter. The first abutment wall 40 typically merges integrally with the second abutment wall 48 about the pivot location 46.

As illustrated more specifically in FIGS. 1, 9, 16 and 17, some of the walls of the body of the container 10 are typically provided with reinforcement ribs 70. Typically, the reinforcement ribs 70 are formed integrally with the corresponding walls and protrude inwardly from the latter. In the embodiments shown throughout the figures, the reinforcement ribs 70 include channels protruding inwardly into the enclosure 36 and extending longitudinally across the container 10. The reinforcement ribs 70 are shown as extending across the first and second end walls 30, 32 and the base wall 26.

It should however be understood that the reinforcement ribs 70 could be made non-integral with the structure, could be formed integrally otherwise including external projections, and could assume other configurations and patterns without departing from the scope of the present invention.

In the embodiments shown throughout the figures, the container 10 is provided with wheels for allowing the container 10 to be rolled on the ground surface 12. It should be understood that container 10 could be deprived of wheels without departing from the scope of the present invention.

Typically, the container 10 includes at least one directional wheel 72 such as caster-type wheel rotatably mounted about a caster-wheel mounting bracket 74. The caster-wheel mounting bracket 74 is typically pivotally attached to the undersurface of the base wall 26 for a swivel movement relative thereto.

The container 10 is also typically provided with a pair of main wheels 76 rollably attached to a main wheel axle 78 extending transversally across the container 10. The main wheel axle 78 is typically positioned adjacent the intersection between the base wall 26 and the second end wall 32. Typically, a pair of main wheel recesses 80 and an axle recess 82 protrudes inwardly and integrally into the enclosure 36 for respectively receiving the main wheel 76 and the main wheel axle 78.

Typically, the container 10 is further provided with a handle 84 extending outwardly from the first end wall 30 generally adjacent the enclosure peripheral edge 38. The handle 84 is configured and sized for allowing manipulation of the container 10 by the hands of an intended user. Also, typically, the container 10 is still further provided with an abutment bracket 86 extending generally outwardly from the second end wall 32 adjacent its intersection with the base wall 26.

Still furthermore, the container 10 is typically provided with a generally inverted L-shaped flange 88 extending outwardly from the opening peripheral edge 38. The flange 88 is typically configured and sized for mating with other structures such as lid-flanges part of conventional container lids (not shown). It should be understood that the container 10 could be deprived of the handle 84, the abutment brackets 86, and the flange 88 without departing from the scope of the present invention.

In use, the container 10 may be transported and tilted either manually or with the help of a conventional forklift truck 14. When used manually, the container 10 may be rolled with the directional wheel 72 and the main wheels 76 contacting the ground surface 12 to a suitable collecting area. When at the collecting site, the container 10 is typically rested on the ground surface 12 in a generally upright collecting or storing configuration such as shown in FIGS. 1 and 11 through 15.

Bulk, granular or any other suitable type of material is inserted into the container 10 in the usual manner through the opening leading into the enclosure 36. When the container 10 needs to be emptied the latter may be rolled to a suitable discharge location by merely pushing on the handle 84 to override the inertia of the container 10 and its content.

Once a suitable discharge area has been reached the container 10 is typically emptied by pivoting the latter forwardly. Pivotal movement of the container 10 is manually exerted on the latter by having the intended user exert a tilting force schematically indicated by arrow 90 in FIG. 7 in a generally upward and frontward direction on the handle 84.

Tilting of the container 10 is usually facilitated by the location of the center of mass of the container since the latter is typically offset forwardly by the angled configuration of the second end wall 32. Typically, the container 10 will initially pivot about the main wheel 76 until it reaches a ground-engaging configuration shown in full length in FIG. 8 wherein the enclosure peripheral edge 38 adjacent the second end wall 32 abuttingly contacts the ground surface 12.

As shown in FIG. 8, when an abutment bracket 86 is provided, the latter acts as a lever for facilitating the pivotal movement of the container 10. The angled configuration of the second end wall 32 also facilitates the discharge of the content of the container 10 once the latter is tilted. Typically, the second end wall 32 is angled so as to form a discharge slope defining an angle 92 with the ground surface 12 when the container 10 is in the ground-engaging configuration shown in full lines in FIG. 8.

If needed, the container 10 may be further tilted to an orthogonal discharge configuration such as shown in phantom lines in FIG. 8. Once the container 10 is emptied, it can be tilted back to its generally upright storage configuration again using the handle 84 and, optionally, the abutment bracket 86 as a fulcrum.

As illustrated more specifically in FIGS. 1 through 6, the container 10 may also be transported and tilted using a convention a forklift truck 14. As shown in FIG. 1, the lifting tines 24 are typically inserted by sliding the latter in the direction leading from the first end wall 30 to the second end wall 32. Alternatively, the lifting tines 24 may be merely lowered to a suitable position and then raised. Regardless of the movement of the lifting tines 24, the latter are adapted to be put into contact with the first abutment walls 40, preferably in generally mating contact therewith.

Typically, the forklift truck 14 is moved, as illustrated by arrow 94 in FIG. 2 in a direction towards the container 10 until the fork attachment section 22 is in a generally proximal or contacting relationship with the first end wall 30. In such a position, the container 10 is typically safely supported by the lifting forks 20 in a generally upright position. The container 10 may hence be lifted and even tilted rearwardly such as shown in FIG. 3 with reduced risks of having the container 10 fall off the lifting forks 20.

As illustrated more specifically in FIG. 2, the container 10 may optionally be releasably secured to the lifting forks 20 using a suitable releasable locking means. In the embodiment shown in FIGS. 1 through 6, the releasable locking means includes a locking arm 96 pivotally attached to an arm spacing bracket 98 extending from the mounting frame 18.

The locking arm 96 is provided with a locking ridge 100 formed at a distal end thereof. The locking ridge 100 is configured and sized for being at least partially insertable into the enclosure 36 in an abutting relationship relative to the first end wall 30 when in a locked configuration. The locking arm 96 is pivotable between the locked configuration illustrated in the generally horizontal position of FIG. 2 and an unlocked configuration illustrated in the angled position shown in FIG. 2 wherein it clears the opening peripheral edge 38 allowing retraction of the container 10.

Typically, an arm-biasing mean biases the locking arm 96 towards its locked configuration while an unlocking mechanism selectively allows the intended user to pivot the locking arm 96 towards its unlocked configuration. The unlocking mechanism may take any suitable form such as an unlocking cable 102 partially winded around re-directing pulleys 104 attached to the mounting frame. 18 and to the frame of the forklift truck 14 enabling the unlocking cable 102 to be operable from the seat of the forklift truck 14.

It should be understood that the container 10 could be used with a forklift truck 14 deprived of releasable locking means or having other types of releasable locking means than those shown in FIGS. 1 through 6 without departing from the scope of the present invention.

As mentioned previously, the pivot location 46 of each sidewall 34 is typically located generally adjacent the projection on the corresponding sidewall 34 of the center of mass of the container 10. The positioning of the pivot locations 46 is hence relatively straightforward in situations wherein the container 10 is to be filled with a relatively homogeneous material. In situations wherein the container 10 is to be filled with various materials having various densities and in which the sequence of insertion into the enclosure 36 is known, the containers 10 may be customized so that their pivot location 46 is still substantially positioned generally adjacent the center of mass of the filled container 10.

Optionally, the containers 10 may also be customized so that the pivot location 46 is located generally off-centered relative to the projection of the center of mass on the sidewalls 34, either towards the first end wall 30 or away from the latter in order to respectively hinder pivotal movement of the container 10 towards the dumping configuration or bias the container 10 towards the tilted dumping configuration.

For example, in situations wherein a releasable locking means prevents tilting of the container 10 towards the tilted dumping configuration, such as shown in FIG. 4, the pivot location 46 may be off-centered towards the second end wall 32 relative to the center of mass of the container 10 so that when the releasable locking means is released, the container 10 will automatically tilt towards the dumping configuration through the action of the gravitational force.

Alternatively, the container 10 may be tilted towards the dumping configuration by exerting a tilting moment of force 106 using any suitable means. For example, an intended user positioned generally adjacent the container 10 may merely use a handle 108 such as a broom handle or the like for imparting an upwardly oriented tilting force 110 on the base wall 26 adjacent the first end wall 30 as shown in FIG. 10.

Regardless of the method used, the container 10 may be easily pivoted between its upright configuration and the tilted dumping configuration. In the tilted dumping configuration, each of the lifting tines 24 abuttingly contacts a corresponding one of the second abutment walls 48 such as shown in FIG. 5. The recessed sections 56 are configured and sized so as to allow the lifting tines 24 to pivot between the upright loading position and the tilted dumping position about the pivot locations 46.

Preferably, the pivot locations 46 form a relatively sharp intersection between the first and second abutment walls 40, 48. This relatively sharp intersection is adapted to facilitate pivotal movement of the container 10 between the upright and tilted positions with reduced risks of leaving the container 10 unstably balanced in an intermediate position between the upright and tilted positions.

When the pivot locations 46 are located off-centered towards the first end wall 30 the container 10 may pivot automatically towards the upright position through the action of the gravitational force upon the container being emptied. As illustrated in FIG. 6, the mounting frame 18 may also be lowered as indicated by arrow 112 so that the opening peripheral edge 38 adjacent the first end wall 32 impacts the ground surface (12) causing a moment of force 114 that will tend to bias the container 10 towards its upright loading position.

As mentioned previously, the container 10 may be provided with numerous variations with respect to the embodiment in FIGS. 1 through 10. For example, FIG. 11 illustrates an alternative embodiment of the invention 116. The embodiment 116 is generally similar to the embodiment 10 and, hence, similar referenced numeral will be used to denote similar components. One of the differences between the embodiment 116 and the embodiment 10 resides in that the embodiment 116 is deprived of clearance walls 58. The second abutment wall 48 extends from the pivot locations 46 to a position generally in register with the opening peripheral edge 38. Consequently, the recessed sections 56 also extend to a position generally in register with the opening peripheral edge 38.

The embodiments shown in FIGS. 1 through 11 illustrated the pivot locations 46 positioned in a generally overlying relation relative to the main wheels 76, in contrast, FIG. 12 illustrates an embodiment of the invention 118 wherein the pivot location 46 is located generally adjacent the base wall 26 and offset towards the first main wall 30 relative to the main wheels 76. The size of the base wall recessed section 66 is hence reduced relative to that of the previous embodiments.

In yet another embodiment of the invention (not shown) the second surface end location 54 generally adjacent the opening peripheral edge 38 and each of the pivot locations 46 are located generally adjacent the base wall 26 so that the second abutment wall 48 extends generally along the full height of the sidewalls 34.

In the embodiments shown in FIGS. 1 through 12, the first and second abutment walls 40, 48 extend in generally perpendicular relationship relative to each other. More specifically, the first abutment walls 40 extend generally horizontally while the second abutment walls 48 extend generally vertically.

In the embodiments 120 through 122 shown respectively in FIGS. 13 through 15, the second abutment walls 48 extend at an angle relative to the corresponding first abutment walls 40. More specifically, the second abutment walls 48 form an angle 124 relative to a vertical plane. The second abutment walls 48 are preferably beveled towards the second end wall 32 in a direction leading from the base wall 26 towards the opening peripheral edge 38. The angled configuration of the second abutment walls 48 is adapted to facilitate the extraction of the body of the container 10 from a manufacturing mold when the container 10 is formed through an injection molding process.

It should be understood that the first abutment walls 40 could extend in other configurations than horizontal and that the second abutment walls 48 could extend in other configurations than the vertical and angled configuration shown throughout the figures without departing from the scope of the present invention.

FIGS. 1 through 13 and 15 illustrate embodiments of the invention wherein the first and second abutment walls 40, 48 form a continuous abutment surface from one longitudinal end thereof to the other. FIG. 14 illustrates an alternative embodiment of the invention wherein the first and second abutment walls 40, 48 each include at least two discreet abutment wall segments 130 spaced apart from each other by corresponding segment spacings 41, 49 and defining spaced apart supporting surfaces. In the embodiment shown in FIG. 14, only three abutment wall segments 130 are used for forming the first and second abutment walls 40, 48. The abutment wall segments 130 are positioned generally adjacent the longitudinal ends of the first and second abutment walls 40, 48 and have a relatively short length.

A common abutment wall segment 130' is positioned at the intersection of the first and second abutment walls 40, 48. This common abutment wall segment 130' is also being used for providing the pivot location 46. It should however be understood that any suitable number of abutment wall segments 130 having any suitable length could be used for forming either one of the first and second abutment walls 40, 48 without departing from the scope of the present invention.

The abutment wall segments 130 typically extend outwardly from adjacent sections of a corresponding side wall 34. In the embodiment shown in FIG. 14, the side walls 34 are generally flat and the abutment wall segments 130 protrude integrally and outwardly therefrom. In should be understood that the sidewalls 34 could have other configurations and that the abutment wall segments 130 could be formed otherwise then by integrally extending sections without departing from the scope of the present invention. For example, alternatively, the abutment wall segments 130 could be made separately and affixed to the side walls 34. Regardless of their construction, the abutment wall segments 130 are configured and sized for forming corresponding abutment surfaces of the first and second abutment walls 40, 48 that are adapted to support the container 121 respectively in the upright and tilted configurations.

FIGS. 1 through 13 and 14 illustrate embodiments of the invention wherein at least one and preferably both of the first abutment walls 40 extend from the outer surface of the container 10. In other words, at least one, and preferably both, of the first abutment walls 40 extend from the base wall peripheral edge 28 and include an adjacent outer peripheral segment of the base wall 26 extending inwardly from the base wall peripheral edge 28. The configuration of such embodiments as seen from a rear view is illustrated in FIG. 16. The first abutment walls are recessed towards the opening peripheral edge 38 relative to an inwardly adjacent segment 126 of the base wall 26.

FIGS. 13 and 15 illustrate embodiments of the invention wherein the pivot locations 46 are formed integrally with the base wall 26, the latter being deprived of base wall recess sections 66. In such embodiments, the first abutment walls 40' may be coplanar with the remainder of the base wall 26 as shown in phantom lines in FIG. 17.

Alternatively, with the embodiments shown in side view in FIGS. 13 and 15, at least one and preferably both of the first abutment walls 40 may be recessed inwardly relative to the base wall peripheral edge 28. The base wall 26 defining a base wall spacing segment 128 between the base wall peripheral edge 28 and the corresponding first abutment wall 40. In such embodiments, as shown in full lines in FIGS. 17, the first abutment walls 40 are recessed towards the opening peripheral edge 38 relative to both the base wall spacing segments 128 and an inwardly adjacent segment of the base wall 26.

Typically, at least one, and preferably both of the second abutment walls 48 are recessed inwardly relative to an adjacent segment of a corresponding sidewall 34 relative to an adjacent segment of a corresponding sidewall 34 located towards the first end wall 30. Also, the second abutment walls 48 typically protrude outwardly and generally perpendicularly from an adjacent segment of a corresponding one of the recessed sections 56.

Alternatively, in an embodiment of the invention not shown, at least one, and preferably both of the second abutment walls 48 may be recessed inwardly relative to the outer surface of the sidewalls 34 defining a sidewall spacing segment between the outer surface of the sidewalls 34 and the second abutment walls 48. In such embodiments, the sidewall spacing segments are typically generally in register with the base wall spacing segments 128 such as shown in FIG. 17.

The embodiments shown in FIGS. 11 through 17 are adapted to be used in substantially the same manner as the embodiments shown in FIGS. 1 through 10, hence, the description of the method of use for these embodiments will not be repeated.

The container 10 and variations thereof including embodiments shown FIGS. 11 through 17 are adapted to be manufactured preferably out of a unitary and integral piece of suitable material. Typically, the container 10 is adapted to be manufactured using a conventional injection molding process and a conventional polymeric resin.

I claim:

1. A container for use with a forklift, said forklift having a pair of generally elongated and spaced apart lifting tines, said container defining a container centre of mass, said container comprising:

a base wall, said base wall defining a base wall peripheral edge;

a first end wall and a second end wall, said first and second end walls both extending from said base wall in a generally opposed relationship relative to each other;

a pair of side walls, each of said side walls extending from said base wall between said first and second end walls and in a generally opposed relationship relative to each other so that said side walls, said first end wall and said second end wall together define an open-topped enclosure having an opening defining an opening peripheral edge;

said base wall defining a pair of first abutment walls, each of said first abutment walls extending in a generally perpendicular relationship relative to an adjacent side wall, from a first surface inner edge to a first surface outer edge, and, in a direction leading generally towards said second end wall, from said first end wall to a pivot location located generally adjacent the projection of said container centre of mass;

each of said side walls defining a corresponding second abutment wall extending in a generally perpendicular relationship relative to the corresponding side wall, from a second surface inner edge to a second surface outer edge, and, in a direction leading generally towards said opening peripheral edge, from said pivot location to a second surface end location;

each of said side walls also defining a corresponding recessed section extending in a generally perpendicular relationship relative to said first and second abutment walls from said pivot location to said second surface end location, said recessed section being recessed inwardly relative to said second abutment wall from said second surface inner edge to said second end wall;

whereby each of said lifting tines is adapted to contact a corresponding one of said first abutment walls for supporting said container in a generally upright position, said recessed section allowing said container to pivot relative to said lifting tines about said pivot location between said upright position and a tilted position wherein each of said lifting tines abuttingly contacts a corresponding one of said second abutment walls.

2. A container as recited in claim 1 wherein said container is made out of an integral piece of material.

3. A container as recited in claim 1 further includes a pair of clearance surfaces, each of said clearance surfaces extending in a generally perpendicular relationship relative to an adjacent side wall, from a clearance surface inner edge to a clearance surface outer edge; and, in a direction leading towards said second end wall, from a corresponding second surface end location to said second end wall.

4. A container as recited in claim 1 wherein each of said second surface end locations is located generally adjacent said opening peripheral edge.

5. A container as recited in claim 1 wherein each of said pivot locations is located generally adjacent said base wall.

6. A container as recited in claim 1 wherein either one of said pairs of first or second abutment walls includes a discontinuous abutment wall made of spaced apart abutment wall segments.

7. A container as recited in claim 1 wherein at least one of said first abutment walls extends from said base wall peripheral edge and includes an adjacent outer peripheral segment of said base wall extending inwardly from said base wall peripheral edge, said at least one of said first abutment walls being recessed towards said opening relative to an inwardly adjacent segment of said base wall.

8. A container as recited in claim 1 wherein at least one of said first abutment walls is recessed inwardly relative to said base wall peripheral edge, said base wall defining a base wall spacing segment between said base wall peripheral edge and said at least one of said first abutment walls, said at least one of said first abutment walls being recessed towards said opening relative to both said base wall spacing segment and an inwardly adjacent segment of said base wall.

9. A container as recited in claim 7 wherein at least one of said second abutment walls is recessed inwardly relative to an adjacent segment of a corresponding side wall located towards said first end wall and said at least one of said second abutment walls protrudes outwardly and generally perpendicularly from an adjacent segment of a corresponding one of said recessed sections.

10. A container as recited in claim 8 wherein at least one of said second abutment walls is recessed inwardly relative to an adjacent segment of a corresponding side wall located towards said first end wall and said at least one of said second abutment walls protrudes outwardly and generally perpendicularly from an adjacent segment of a corresponding one of said recessed sections.

11. A container as recited in claim 1 wherein said pivot location forms a relatively sharp intersection between said first and second abutment walls.

12. A container as recited in claim 1 wherein said first abutment walls extend generally horizontally and said second abutment walls extend generally vertically.

13. A container as recited in claim 1 wherein said second abutment walls extend at an angle relative to said first abutment walls, said second abutment walls diverging towards said second end wall in a direction leading towards said opening.

14. A container as recited in claim 1 wherein said second end wall tapers inwardly towards said first end wall in a direction leading from said opening peripheral edge to said base wall.

15. A container as recited in claim 14 wherein said base wall and said opening peripheral edge extends substantially in generally parallel and spaced apart first and second referential planes, said first end wall extending substantially in a third referential plane generally perpendicular to said first and second referential planes and said side walls extending substantially respectively in fourth and fifth spaced apart referential planes both generally perpendicular to said first through third referential planes.

16. A container for use with a forklift, said forklift having a pair of generally elongated and spaced apart lifting tines, said container defining a container centre of mass, said container comprising:

a base wall, said base wall defining a base wall peripheral edge;

a first end wall and a second end wall, said first and second end walls both extending from said base wall in a generally opposed relationship relative to each other;

a pair of side walls, each of said side walls extending from said base wall between said first and second end walls and in a generally opposed relationship relative to each other so that said side walls, said first end wall and said second end wall together define an open-top enclosure having an opening defining an opening peripheral edge;

each of said side walls defining a corresponding side wall recessed section extending from said second end wall to a corresponding second abutment wall, each of said side wall recessed sections being recessed inwardly relative to a corresponding side wall adjacent section of said side wall located towards said first end wall, said second abutment wall extending integrally between said side wall recessed section and said side wall adjacent section in a generally perpendicular relationship relative to the latter;

said base wall defining a base wall recessed section extending from said first end wall to said side wall recessed section, said base wall recessed section being recessed towards said opening relative to a base wall adjacent section located inwardly relative to said base wall recessed section, said base wall recessed section being also recessed inwardly relative to said side wall adjacent section, a first abutment wall extending integrally between said base wall recessed section and said side wall adjacent section in a generally perpendicular relationship relative to the latter;

said first abutment wall extending in a generally perpendicular relationship relative to said second abutment wall and merging integrally with the latter at a pivot location located generally adjacent said container centre of gravity;

whereby each of said lifting tines is adapted to contact a corresponding one of said first abutment walls for supporting said container in a generally upright position, said recessed section allowing said container to pivot relative to said lifting tines about said pivot location between said upright position and a tilted position wherein each of said lifting tines abuttingly contacts a corresponding one of said second abutment walls.

17. A container as recited in claim 16 wherein said second end wall tapers inwardly towards said first end wall in a direction leading from said opening peripheral edge to said base wall; said side wall recessed section having a generally inverted and frustro-triangular configuration defining an apex, said base wall recessed section having a generally rectangular configuration merging integrally with said side wall recessed section adjacent said apex.

18. In combination, a container and a pair of lifting tines part of a fork-lift, said lifting tines being generally elongated and spaced apart from each other, said container defining a container centre of mass, said container comprising:

a base wall, said base wall defining a base wall peripheral edge;

a first end wall and a second end wall, said first and second end walls both extending from said base wall in a generally opposed relationship relative to each other;

a pair of side walls, each of said side walls extending from said base wall between said first and second end walls and in a generally opposed relationship relative to each other so that said side walls, said first end wall and said second end wall together define an open-top enclosure having an opening defining an opening peripheral edge;

said base wall together defining with each of said side walls a corresponding recessed section recessed inwardly relative to a corresponding adjacent section of each of said side walls;

a first abutment wall and a second abutment wall both extending integrally between each of said recessed sections and corresponding adjacent section, each of said first and second abutment walls intersecting each other about a corresponding pivot location;

said first abutment walls being configured and sized for abuttingly supporting said container on said tines in a generally upright configuration, said second abutment walls being configured and sized for supporting said container on said tines in a generally tilted configuration and said recessed section being configured and sized so as to allow said container to be pivoted between said generally upright and generally tilted positions about the intersections between said first and second abutment walls.

19. A container as recited in claim 18 wherein said first abutment walls extend from said first end surface so as to allow said tines to be slidably inserted underneath said first abutment walls from said first end surface.

20. A container as recited in claim 18 wherein said intersections between said first and second abutment walls is located generally adjacent said container centre of mass.

* * * * *